United States Patent

Strauss et al.

[11] Patent Number: 5,340,868
[45] Date of Patent: Aug. 23, 1994

[54] FIBROUS GLASS BINDERS

[75] Inventors: Carl R. Strauss, Newark; Steven H. Williams, Alexandria, both of Ohio

[73] Assignee: Owens-Corning Fiberglass Technology Inc., Summit, Ill.

[21] Appl. No.: 79,411

[22] Filed: Jun. 21, 1993

[51] Int. Cl.$^5$ ............... C08K 5/10; C08L 39/00
[52] U.S. Cl. ............................ 524/461; 524/555
[58] Field of Search ............ 524/461, 555, 514

[56] References Cited

U.S. PATENT DOCUMENTS 4,076,917  2/1978  Swift et al. .
4,115,637  9/1978  Cenci et al. .................. 524/555

Primary Examiner—Joseph L. Schofer
Assistant Examiner—Jeffrey T. Smith
Attorney, Agent, or Firm—Ted C. Gillespie; Charles H. Ellerbrock

[57] ABSTRACT

A fibrous glass binder comprises a polycarboxy polymer, a β-hydroxyalkylamide, and an at least trifunctional monomeric carboxylic acid.

11 Claims, No Drawings

FIBROUS GLASS BINDERS

FIELD OF THE INVENTION

This invention relates generally to fibrous glass binders. More particularly, the invention is directed to a low viscosity binder for application to a fibrous glass mat, which binder rigidly cures to form a fibrous glass bat having excellent compression recovery characteristics.

BACKGROUND OF THE INVENTION

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize a majority all of the water from the binder, thereby leaving the remaining components of the binder on the fibers as a viscous or semi-viscous high-solids liquid. The coated fibrous mat, which is formed in a compressed state due to the tremendous flow of air through the mat in the forming chamber, is then transferred out of the forming chamber to a transfer zone where the mat vertically expands due to the resiliency of the glass fibers. This vertical expansion is extremely important to the successful manufacture of commercially acceptable fibrous glass thermal or acoustical insulation products. Thereafter, the coated mat is transferred to a curing oven where heated air is blown through the mat to cure the binder and rigidly bond the glass fibers together.

Phenol-formaldehyde binders are widely used because they have a low viscosity in the uncured state, yet form a rigid thermoset polymeric matrix for the glass fibers when cured. A low binder viscosity in the uncured state is required to allow the maximum vertical expansion of the coated mat when it exits the forming chamber. A binder which forms a rigid matrix when cured is required so that a finished fibrous glass thermal or acoustical insulation product, when compressed for packaging and shipping, will recover to its as-made vertical dimension when installed in a building.

Insulation manufacturers have long desired an alternative polymeric binder system for fibrous glass products. However, low molecular weight, low viscosity binders which allow maximum vertical expansion of the mat in the transfer zone generally cure to form a non-rigid plastic matrix in the finished product, thereby reducing the attainable vertical height recovery of the finished insulation product when installed. Conversely, high viscosity binders which generally cure to form a rigid matrix in the finished product do not allow maximum vertical expansion of the coated, uncured mat.

U.S. Pat. No. 4,076,917 to Swift et al. discloses the use of β-hydroxyalkylamides to cure polycarboxy polymers such as acrylic acid. Such a system, however, is too viscous for use as a fibrous glass binder.

It would be desirable to prepare a non-phenol formaldehyde binder having a low viscosity when uncured and structural rigidity when cured.

SUMMARY OF THE INVENTION

Accordant with the present invention, a fibrous glass binder having the desired characteristics surprisingly has been discovered. The binder comprises an aqueous solution of:
A) a polycarboxy polymer;
B) a β-hydroxyalkylamide; and
C) an at least trifunctional monomeric carboxylic acid.

Moreover, the invention is directed to a fibrous glass bat made with the inventive binder.

DETAILED DESCRIPTION OF THE PREFERRED EMBODIMENT

The binder according to the present invention comprises an aqueous solution of a polycarboxy polymer, a β-hydroxyalkylamide, and a monomeric carboxylic acid. The viscosity of the binder is very low, due to the use of the monomeric carboxylic acid, and provides a maximized vertical expansion of the fibrous glass mat as it exits the forming chamber; similar to that vertical expansion provided by the well-known phenol-formaldehyde binders. Generally, the use of a monomeric reactant in a low viscosity curable resin results in a weak thermoset structure when cured. Surprisingly, it has been discovered that the use of a monomeric carboxylic acid provides low viscosity yet allows the formation of a rigid thermoset when a resin comprising a polycarboxy polymer and a β-hydroxyalkylamide is cured.

The polycarboxy polymer of the present invention comprises an organic polymer or oligomer containing more than one pendant carboxy group. The polycarboxy polymer may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polycarboxy polymer may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art.

The polycarboxy polymer of the present invention may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art.

Preferred polycarboxy polymers comprise homopolymers and copolymers of polyacrylic acid.

Contemplated equivalent at least trifunctional monomeric carboxylic acids according to the present invention having the same operability and utility include, but are not necessarily limited to, citric acid, trimellitic acid, hemimellitic acid, trimesic acid, tricarballylic acid, 1,2,3,4-butanetetracarboxylic acid, pyromellitic acid, and the like, as well as mixtures thereof.

Preferred monomeric carboxylic acids comprise citric acid and 1,2,3,4-butanetetracarboxylic acid, as well as mixtures thereof.

The β-hydroxyalkylamide according to the present invention is characterized by the general formula:

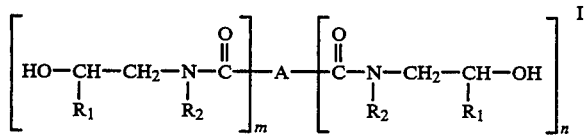

wherein $R_1$ is H or $C_1$–$C_5$ alkyl; $R_2$ is H, $C_1$–$C_5$ alkyl, or —$CH_2$—$CR_1H$—OH wherein $R_1$ is as described above; A is a single bond or a monovalent or polyvalent organic radical derived from a saturated, unsaturated, or aromatic substituted or unsubstituted hydrocarbon radical containing from 1 to about 20 carbon atoms; m is equal to 1 or 2; n is equal to 0 or 2; and m+n is at least 2.

Specific examples of β-hydroxyalkylamides according to Formula I include, but are not necessarily limited to, bis[N,N-di(β-hydroxyethyl)] adipamide, bis[N,N-di(β-hydroxypropyl)] succinamide, bis[N,N-di(β-hydroxyethyl)] azelamide, bis[N,N-di(β-hydroxypropyl)] adipamide, and bis[N-methyl-N-(β-hydroxyethyl)] oxamide, as well as mixtures thereof. A preferred β-hydroxyalkylamide comprises bis[N,N-di(β-hydroxyethyl)] adipamide.

The β-hydroxyalkylamides of the present invention are well-known, and may be prepared generally by reacting a lower alkyl ester or mixture of esters of carboxylic acids with a β-hydroxyalkylamine at a temperature ranging from ambient temperature up to about 200° C. depending upon the choice of reactants and the presence or absence of a catalyst. Suitable catalysts include base catalysts such as sodium methoxide, sodium butoxide, sodium hydroxide, potassium hydroxide, etc., present in amounts from about 0.1% to about 1% by weight of the alkyl ester.

The polycarboxy polymer, β-hydroxyalkylamide, and monomeric carboxylic acid may be mixed in any conventional mixing device. The polycarboxy polymer may be present at a concentration from about 5% to about 50% by weight of the total weight of the mixture. Preferably, the polycarboxy polymer is present at a concentration from about 10% to about 30% by weight. The β-hydroxyalkylamide may be present at a concentration from about 20% to about 70% by weight of the total weight of the mixture. Preferably, the concentration of β-hydroxyalkylamide ranges from about 35% to about 55% by weight. The monomeric carboxylic acid may be present at a concentration from about 5% to about 60% by weight of the total weight of the mixture. Preferably, the concentration is from about 15% to about 40% by weight. It will be readily apparent to one ordinarily skilled in the art that the concentration ranges for the polycarboxy polymer, β-hydroxyalkylamide, and monomeric carboxylic acid may vary over wide limits and are not sharply critical to the successful practice of the present invention. Water may be added to the mixture in any amount which would produce an aqueous binder having a viscosity and flow rate suitable for its application to a forming fibrous glass mat by any convenient method, such as by spraying. Conveniently, water may comprise up to about 95% by weight of the binder.

The binders of the present invention may optionally contain conventional adjuvants such as, for example, coupling agents, dyes, oils, fillers, thermal stabilizers, flame retarding agents, lubricants, and the like, in conventional amounts generally not exceeding 20% of the weight of the binder.

In operation, the inventive binder is applied to glass fibers as they are being produced and formed into a mat, water is volatilized from the binder, and the high-solids binder-coated fibrous glass mat is heated to cure the binder and thereby produce a finished fibrous glass bat which may be used as a thermal or acoustical insulation product, a reinforcement for a subsequently produced composite, etc.

It is generally well-known in the art to produce a porous mat of fibrous glass by fiberizing molten glass and immediately forming a fibrous glass mat on a moving conveyor. Glass is melted in a tank and supplied to a fiber forming device such as a spinner or a bushing. Fibers of glass are attenuated from the device and are blown generally downwardly within a forming chamber. The glass fibers typically have a diameter from about 2 to about 9 microns and have a length from about ¼ inch to about 3 inches. Preferably, the glass fibers range in diameter from about 3 to about 6 microns, and have a length from about ½ inch to about 1 ½ inches. The glass fibers are deposited onto a perforated, endless forming conveyor. The binder is applied to the glass fibers as they are being formed by means of suitable spray applicators so as to result in a distribution of the binder throughout the formed mat of fibrous glass. The glass fibers, having the uncured resinous binder adhered thereto, are gathered and formed into a mat on the endless conveyor within the forming chamber with the aid of a vacuum drawn through the mat from below the forming conveyor. The residual heat contained in the glass fibers as well as the air flow through the mat causes a majority of the water to volatilize from the mat before it exits the forming chamber.

As the high-solids resin-coated fibrous glass mat emerges from the forming chamber, it expands vertically due to the resiliency of the glass fibers. The expanded mat is then conveyed to and through a curing oven wherein heated air is passed through the mat to cure the resin. Flights above and below the mat slightly compress the mat. to give the finished product a predetermined thickness and surface finish. Typically, the curing oven is operated at a temperature from about 200° C. to about 325° C. Preferably, the temperature ranges from about 250° C. to about 300° C. Generally, the mat resides within the oven for a period of time from about ½ minute to about 3 minutes. For the manufacture of conventional thermal or acoustical insulation products, the time ranges from about ¾ minute to about 1½ minutes. The fibrous glass having a cured, rigid binder matrix emerges from the oven in the form of a bat which may be compressed for packaging and shipping and which will thereafter substantially fully recover its as-made vertical dimension when unconstrained. By way of example, a fibrous glass mat which is about 1 ¼ inches thick as it exits from the forming chamber, will expand to a vertical thickness of about 9 inches in the transfer zone, and will be slightly compressed to a vertical thickness of about 6 inches in the curing oven.

EXAMPLE

Binders containing the following ingredients are prepared and applied to fibrous glass as it is formed into a mat.

TABLE I

| | BINDER INGREDIENTS | |
|---|---|---|
| | Ingredients | Parts By Weight |
| Example* | Polyacrylic Acid (MW = 60,000) | 19 |
| | bis[N,N-di(β-hydroxyethyl)] adipamide | 50 |
| | Citric Acid | 31 |
| | Water | 900 |
| Comparison | Phenol-formaldehyde Resin | 100 |
| | Water | 900 |

*Small amounts of an aminosilane coupling agent and an oil emulsion for dust control are present.

The mats coated with the two binders vertically expand to approximately the same height as they exit the forming section. Thereafter the mats are slightly compressed to a thickness of about 6 inches while being cured using a flow of heated air at a temperature of about 75° C. The cured bats exhibit the following recoveries after being compressed for a period of about 3 weeks.

TABLE II

| BAT RECOVERIES | |
|---|---|
| | Recovered Height (Inches) |
| Example | 6.3 |
| Comparison | 6.3 |

What is claimed is:

1. A fibrous glass binder, comprising an aqueous solution of:
   A) a polycarboxy polymer;
   B) a β-hydroxyalkylamide; and
   C) at least trifunctional monomeric carboxylic acid.

2. The fibrous glass binder according to claim 1, wherein the polycarboxy polymer comprises homopolymers and copolymers of polyacrylic acid.

3. The fibrous glass binder according to claim 1, wherein the β-hydroxyalkylamide comprises bis[N,N-di(β-hydroxyethyl)] adipamide.

4. The fibrous glass binder according to claim 1, wherein the at least trifunctional monomeric carboxylic acid comprises citric acid.

5. The fibrous glass binder according to claim 1, wherein the at least trifunctional monomeric carboxylic acid comprises 1,2,3,4-butanetetracarboxylic acid.

6. The fibrous glass binder according to claim 1, wherein the at least trifunctional monomeric carboxylic acid comprises a mixture of citric acid and 1,2,3,4-butanetetracarboxylic acid.

7. The fibrous glass binder according to claim 1, wherein the polycarboxy polymer comprises from about 10% to about 30% by weight of the total weight of components A, B, and C.

8. The fibrous glass binder according to claim 1, wherein the β-hydroxyalkylamide comprises from about 35% to about 55% by weight of the total weight of components A, B, and C.

9. The fibrous glass binder according to claim 1, wherein the at least trifunctional monomeric carboxylic acid comprises from about 15% to about 40% by weight of the total weight of components A, B, and C.

10. The fibrous glass binder according to claim 1, wherein water comprises up to about 95% by weight of the binder.

11. A fibrous glass binder, comprising an aqueous solution of:
    A) a homopolymer of copolymer of polyacrylic acid;
    B) bis[N,N-di(β-hydroxyethyl)] adipamide; and
    C) at least trifunctional monomeric carboxylic acid selected from the group consisting of citric acid, 1,2,3,4-butanetetracarboxylic acid, and mixtures thereof.

* * * * *